United States Patent [19]

Keemer et al.

[11] Patent Number: 5,215,579
[45] Date of Patent: Jun. 1, 1993

[54] WATER RESISTANT METAL PIGMENT PARTICLES

[75] Inventors: Craig Keemer, Fleetwood; William G. Jenkins, Plymouth; H. Taylor Lamborn, Reading; Joseph B. Scheller, Orefield, all of Pa.

[73] Assignee: Silberline Manufacturing Co., Inc., Tamaqua, Pa.

[21] Appl. No.: 813,439

[22] Filed: Dec. 26, 1991

[51] Int. Cl.$^5$ .................. C09C 1/62; C09C 1/64
[52] U.S. Cl. .................. 106/404; 106/419; 106/429; 106/499; 106/503; 106/287.17; 106/287.23; 106/287.25; 106/287.29; 106/287.3
[58] Field of Search ........... 106/404, 419, 429, 499, 106/503, 287.17, 287.23, 287.25, 287.29, 287.3

[56] References Cited

U.S. PATENT DOCUMENTS

| | | | |
|---|---|---|---|
| 3,890,166 | 6/1975 | Kondis | 106/404 |
| 4,522,655 | 6/1985 | Claassen et al. | 106/404 |
| 4,565,716 | 1/1986 | Williams, Jr. et al. | 106/404 |
| 4,693,754 | 9/1987 | Kondis | 106/404 |
| 4,808,231 | 2/1989 | Kondis et al. | 106/404 |
| 4,885,032 | 12/1989 | Okai et al. | 106/404 |
| 5,011,533 | 4/1991 | Kuwajima et al. | 106/404 |
| 5,057,156 | 10/1991 | Kuwajima et al. | 106/404 |
| 5,156,677 | 10/1992 | Carpenter et al. | 106/499 |

Primary Examiner—Mark L. Bell
Assistant Examiner—Helene Klemanski
Attorney, Agent, or Firm—Wegner, Cantor, Mueller & Player

[57] ABSTRACT

Metal pigment particles treated with an organic phosphate, phosphite or a pentavalent vanadium compound and a nitro-containing compound show increased stability against attack by water. The particles are especially useful in aqueous coating compositions.

16 Claims, No Drawings

WATER RESISTANT METAL PIGMENT PARTICLES

BACKGROUND OF THE INVENTION

The present invention is related to paste compositions containing metal pigments suitable for forming coating compositions, particularly aqueous coating systems. Increasingly stringent environmental regulations have required that coating systems dramatically reduce volatile organic solvent levels. One way to comply with such regulations is to use water in place of the volatile organic solvents previously used.

However, in the area of coating systems utilizing metal pigment particles, aqueous systems present rather formidable difficulties. This is particularly true with respect to aluminum and zinc pigments. Thus, the metal pigment can readily react with water to generate hydrogen gas. The amount of gas generated can produce a safety hazard, creating high pressures within the composition containers. Also, the water reaction substantially diminishes the aesthetic value of metal pigments. The reaction of aluminum pigments with water can be depicted as follows:

$$2Al + 6H_2O \rightarrow 2Al(OH)_3 + 3H_2(g)$$

Due to the increasing demand for aqueous systems, a number of techniques have been proposed for inhibiting the attack on the pigment particles by water. Unfortunately, most of these techniques have not provided sufficient protection.

One technique that provides inhibiting properties is the passivation of the metal pigment particles with an ionic organic phosphate as disclosed by Williams et al., U.S. Pat. No. 4,565,716. Other techniques involve the use of compounds containing pentavalent vanadium compounds as disclosed in Kondis U.S. Pat. No. 4,693,754, or the use of organic phosphites as disclosed in Kondis et al. U.S. Pat. No. 4,808,231. Another composition of matter utilized to produce an aluminum paste for use in aqueous systems uses nitroparaffin solvents to inhibit the evolution of hydrogen gas. However, through the addition of nitro-containing solvents we have improved upon the passivation of metal pigment particles utilizing organic phosphates, phosphites, or vanadium compounds.

SUMMARY OF THE INVENTION

The present invention provides a composition of matter which comprises metal particles treated with either (a) an ionic organic phosphate compound, for example as taught in Williams et al., U.S. Pat. No. 4,565,716, or (b) a pentavalent vanadium compound, for example as taught in Kondis, U.S. Pat. No. 4,693,754, or (c) an organic phosphite compound as taught in Kondis et al. U S. Pat. No. 4,808,231, and a nitro-containing solvent such as a nitroparaffin. The treated metal pigment particles can be used to form a pigment paste. The metal particles. e.g. aluminum flakes, which have been treated with the phosphate, phosphite, or vanadate and nitro-containing compound are stabilized to a degree suitable for use in aqueous coating systems. The combination of the treatment with both the phosphate, phosphite, or vanadium compounds and the nitro-containing solvents produces a metal pigment paste which has improved gassing stability over the separately treated products.

DESCRIPTION OF THE PREFERRED EMBODIMENT

As indicated above, the present invention is based on the discovery that a combination of certain types of organic phosphate compounds, organic phosphite compounds or pentavalent vanadium compounds and a nitro-containing solvent effectively stabilizes metal pigments from reacting with water, rendering the pigment suitable for use in water-based coatings without significant degradation of optical properties. Either the phosphate compound, the phosphite compound, the vanadium compound or the nitro-containing solvent, used individually, provides some measure of stability for metal pigments in water-based coatings, but the combination of the nitro-containing solvent with either the phosphate, the phosphite or the vanadate provides greatly enhanced stability. The present invention is especially useful for zinc and aluminum pigments.

The phosphate compound may be of the type described in Williams et al., U.S. Pat. No. 4,565,716, the disclosure of which is incorporated herein by reference. The terms "organic phosphate" and "phosphate" used herein should be understood to encompass materials having the following formulas:

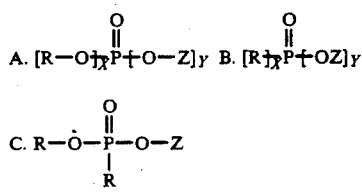

wherein:
$X = 1$ or 2
$Y = 1$ or 2 and
$X + Y = 3$;
where Z is hydrogen or a means for neutralizing acid phosphate; and where each R group is independently benzo; a halo group; an alkyl group having from 1 to 24 carbon atoms; a cycloalkyl group having from 3 to 20 carbon atoms; an aryl group having from 6 to 40 carbon atoms; an alpha or beta naphthyl; a substituted alkyl, cycloalkyl, aryl, or naphthyl group, as defined above, where said substituent is alkyl, cycloalkyl, aryl, or naphthyl; or a heterosubstituent substituted alkyl, cycloalkyl, aryl, or naphthyl group, as defined above, where said heterosubstituents are selected from the group consisting of amino, hydroxy, epoxy, nitrilo, nitro, carboxy, carbonyl, pyridinyl, alpha or beta furyl, or alpha or beta thienyl. Representative examples of means for neutralizing acid phosphate are Na, Li, K, Zn, Mg, Ca, and $NH_L(R')_M$, where $L + M = 3$ or 4

$R' = C_nH_{2n+1}$ or $C_nH_{2n}OH$ and $n = 1$ to 20

Preferred compounds are those of the type shown in Formula A, where the R groups each contain 8 or more carbon atoms, and Z is an amino group. Two especially preferred materials are marketed by Albright and Wilson Americas, Inc., under the tradenames Virco-Pet ® 40 and Virco-Pet ® 50. The concentration of the phosphate compound should be from 1% to 25%, preferably 3% to 15%, based on metal pigment weight.

Organic phosphites are derivatives of phosphorous acid, rather than phosphoric acid used to produce organic phosphates. These may or may not be neutralized. The organic R groups and the inorganic Z groups are the same as defined above. The organic phosphite may be of the type described in Kondis et al. U.S. Pat. No. 4,808,231, the disclosure of which is incorporated herein by reference. Preferred are alkyl-substituted phosphites; especially preferred dilauryl hydrogen phosphite, dioctyl hydrogen phosphite, and dioleyl hydrogen phosphite. The concentration of the phosphite compound should be 2% to 15%, preferably 5% to 10%, based on metal pigment weight.

The pentavalent vanadium compound may be vanadium pentoxide ($V_2O_5$), a species containing an oxovanadium anion, a vanadium oxo halide, or a vanadium alkoxide. Preferred are species containing an oxovanadium anion, where the corresponding cation is an alkaline or alkaline earth metal ion or $NH_L(R+)_M^+$;

where $L+M=4$ $R'=C_nH_{2n+1}$ or $C_nH_{2n}OH$ and $n=1$ to 20

Examples of oxovanadium anions are $VO_3-$, $VO_4^{3-}$, $V_2O_7^{4''}$, $V_3O_8-$, $V_{10}O_{28}^{6-}$, and various protonated forms of each. The concentration of the pentavalent vanadium compound should be from 1% to 30%, preferably 5% to 15%, based on metal pigment weight.

The nitro-containing solvent may be a member of the alkyl or aryl series, or a halo- or amino-substituted alkyl or aryl, containing 1 to 20 carbon atoms and a nitro ($-NO_2$) functional group. The lower members of the nitroparaffin series, i.e., nitromethane, nitroethane and 1-nitropropane, are preferred on the basis of toxicological properties and availability. The nitro-containing solvent should be present at 5% to 100%, but preferably 20% or more, most preferably 35% or more, of the total weight of solvent in the final metal pigment paste. The solvent is generally about 28% to 50% by weight of the paste.

The preferred method to incorporate the vanadate compound is a variation of the slurry method taught in Kondis U.S. Pat. No. 4,693,754, the disclosure of which is incorporated herein by reference. A metal pigment particle filter cake or paste—typically containing 50% to 95%, preferably 60% to 85%, of metal pigment in mineral spirits solvent—is slurried in a mixture composed of 30% to 94.5%, preferably 65% to 89%, of the nitro-containing solvent; 5% to 40%, preferably 10% to 25%, of a water-miscible organic solvent such as an alcohol, glycol, glycol ether, or glycol ether acetate; and 0.5% to 30%, preferably 1% to 10%, of water, along with the desired amount of the vanadium compound. The slurry is mixed vigorously at a temperature of 20° C. to 100° C., preferably 50° C. to 80° C., for a period of time ranging from 0.5 to 72 hours, preferably 5 to 48 hours; and then is filtered to obtain the desired final non-volatile content, typically 60% to 72%.

One preferred method to incorporate the phosphate or phosphite compound and the nitro-containing solvent with the aluminum pigment is referred to as "cake reduction," wherein a treatment solution of the phosphate or phosphite compound in the nitro-containing solvent is used to reduce, or dilute, a metal pigment particle filter cake to a paste. The filter cake is typically 75% to 95%, preferably 78% to 85%, of metal pigment in mineral spirits solvent. The filter cake is charged into a mixer, and the treatment solution is added, in a quantity sufficient to provide both the phosphate or phosphite compound and the nitro-containing solvent within the preferred ranges. Other organic solvents, as needed or desired, may be used. These include, but are not limited to, mineral spirits; high flash naphtha; alcohols; glycols; glycol ethers; glycol ether acetates: toluene; xylene; and ketones. Water may also be used as a solvent, provided that a surfactant or a water-miscible solvent is also used to provide a homogeneous product. The total amount of solvent added should be sufficient to obtain the desired final non-volatile content; typically, 60% to 72%.

The filter cake, treatment solution, and other solvents, if used, are mechanically mixed for a period of time from 5 minutes to 8 hours. The mixing time should be long enough to assure a uniform distribution of the treatment solution and the metal pigment particles, but not so long as to adversely affect the optical properties of the pigment.

Although the "cake reduction" method is preferred, other techniques may be used to produce a water-stable metal pigment paste. In one method, the metal pigment filter cake is slurried in an excess of the nitro-containing solvent. The slurry is mechanically mixed for a period of time from 5 minutes to 1 hour, then filtered to a non-volatile content of 75% to 95%, preferably 78% to 85%. This filter cake, in which the nitro-containing compound is essentially the only solvent, is then treated with the phosphate or phosphite compound and additional solvent, either the nitrocontaining compound or other solvents, using the "cake reduction" method. A variation of the above method is to slurry the pigment filter cake in an excess of a solution of the phosphate or phosphite compound in the nitro-containing solvent. This slurry is mechanically mixed as described above, then filtered to the nonvolatile content desired for the final product, typically 60% to 72%. Both of these methods can be used to yield a product which is essentially free of mineral spirits.

In addition to the post-milling treatment methods described above, another technique is to introduce the nitro-containing solvent and/or the phosphate or phosphite compound into the ball mill, thus stabilizing the metal pigment surfaces as they are being generated. If only one of the two ingredients is added to the ball mill, the other one can be incorporated using the "cake reduction" method.

The preferred treatment process provides excellent stability, regardless of the lubricant used in milling, and does not alter the leafing or non-leafing behavior of the pigment. The process also provides excellent stability using pigments of either regular or high purity metal.

The pigment paste obtained can be used in a variety of known coating systems, as a direct replacement for currently used pastes. Examples include maintenance, general industrial, roof coating, and automotive coating systems. Thus, the paste may be used, for example, with acrylic polymer emulsions, water reducible alkyd resin systems, water reducible alkyd/melamine cross-linked systems, waterborne epoxy coatings, polyester emulsions and water reducible polyester melamine coatings.

EXAMPLES

Example 1

492 grams of a non-leafing aluminum pigment filter cake (79% aluminum in mineral spirits) is charged into a mixer. To this is added 61.9 grams of Virco-Pet ® 50 (70% water-insoluble phosphate ester in mineral spirits, from Albright and Wilson) and 96.1 grams of nitroethane, so that the nitroethane represents 44.1% of the total solvents. The material is mixed for one hour, then tested for aqueous stability as described below.

Example 2

The aluminum pigment filter cake of Example 1 is slurried in nitroethane, then filtered to a metal content of 78.5% to essentially replace the mineral spirits with nitroethane. 489 grams of this washed filter cake is charged into a mixer, then 61.9 grams of Virco-Pet ® 50 and 100 grams of nitroethane are added, so that the nitroethane represents 91.7% of the total solvents. The material is mixed for one hour, then tested for aqueous stability.

Comparative Example 1

492 grams of the aluminum pigment filter cake of Example 1 is charged into a mixer, and 61.9 grams of Virco-Pet ® 50 and 96.1 grams of high flash naphtha are added. The material is mixed for one hour, then tested for aqueous stability.

Comparative Example 2

488 grams of the aluminum pigment filter cake of Example 1 is charged into a mixer, and 103 grams of nitroethane is added, so that the nitroethane represents 50.1% of the total solvents. The material is mixed for one hour, then tested for aqueous stability.

Comparative Example 3

488 grams of the washed aluminum pigment filter cake of Example 2 is charged into a mixer, and 103 grams of nitroethane is added, so that the nitroethane represents essentially 100% of the total solvent. The material is mixed for one hour, then tested for aqueous stability.

The aluminum pigment pastes from the above examples were incorporated into a general industrial coating formulation, prepared as follows:

Enough of each paste to yield 20.2 grams of aluminum is weighed out. 24.8 grams of glycol ether PM, 6.2 grams of glycol ether DPM, 4.7 grams of Surfynol 104BC (Air Products), 61.9 grams of deionized water, and 312.2 grams of 76 Resin 1018 (Unocal), a styrene-acrylate copolymer emulsion, is added, and the mixture blended until uniform.

The paints obtained are placed in a constant temperature bath at 52° C., and the gas evolved is collected in an inverted water-filled buret for 168 hours. The data are summarized in Table 1.

TABLE 1

| EXAMPLE NUMBER | VIRCO-PET ® 50 PERCENT OF ALUMINUM | NITRO-ETHANE PERCENT OF SOLVENT | MLS. H$_2$ EVOLVED 168 HRS. @ 52° C. |
|---|---|---|---|
| 1 | 16.13 | 44.1 | 3.4 |
| 2 | 16.13 | 91.7 | 6.4 |
| COMPARATIVE EXAMPLE NUMBER | | | |
| 1 | 16.13 | 0 | 11.5 |
| 2 | 0 | 50.1 | 38.8 (3 hrs.) |
| 3 | 0 | 100.0 | >100 (19 hrs.) |

The data clearly show the synergy between the phosphate and the nitroethane. Nitroethane alone confers very little stability in this system, and the samples had to be removed very early in the test, due to excessive gas generation. Virco-Pet ® 50, alone, provides fairly low gassing, but the results when it is combined with nitroethane are much better.

Example 3

488 grams of the aluminum pigment filter cake of Example 1 is charged into a mixer. To this is added 48.1 grams of Virco-Pet ® 40 (90% water-soluble phosphate ester in diethyl amine, from Albright and Wilson), and 107 grams of nitroethane, so that the nitroethane represents 49.6% of the total solvents. The material is mixed for one hour, then tested for aqueous stability.

Example 4

489 grams of the washed aluminum pigment filter cake of Example 2 is charged into a mixer, and 48.1 grams of Virco-Pet ® 40 and 107 grams of nitroethane is added, so that the nitroethane represents 97.8% of the total solvents. The material is mixed for one hour, then tested for aqueous stability.

Example 5

489 grams of the washed aluminum pigment filter cake of Example 2 is charged into a mixer, and 14.5 grams of Virco-Pet ® 40 and 141 grams of nitroethane is added, so that the nitroethane represents 99.4% of the total solvent. The material is mixed for one hour, then tested for aqueous stability.

Comparative Example 4

488 grams of the aluminum pigment filter cake of Example 1 is charged into a mixer, and 48.1 grams of Virco-Pet ® 40 and 107 grams of high flash naphtha is added. The material is mixed for one hour, then tested for aqueous stability.

The aluminum pigment pastes from the above examples were incorporated into the general industrial coating formulation described above, and tested for gas evolution The data are summarized in Table 2.

TABLE 2

| EXAMPLE NUMBER | VIRCO-PET ® 40 PERCENT OF ALUMINUM | NITRO-ETHANE PERCENT OF SOLVENT | MLS. H$_2$ EVOLVED 168 HRS. @ 52° C. |
|---|---|---|---|
| 3 | 12.53 | 49.6 | 54.2 |
| 4 | 12.53 | 97.8 | 16.9 |

TABLE 2-continued

| | VIRCO-PET ® 40 PERCENT OF ALUMINUM | NITRO-ETHANE PERCENT OF SOLVENT | MLS. H₂ EVOLVED 168 HRS. @ 52° C. |
|---|---|---|---|
| 5 | 3.76 | 99.4 | 25.5 |
| COMPARATIVE EXAMPLE NUMBER | | | |
| 4 | 12.53 | 0 | >100.0 (48 hrs.) |

Again, the results, when both nitroethane and the phosphate are present, are much better than for either one alone. It can t also be seen that, in this paint formulation, Virco-Pet ® 40 is not as effective as Virco-Pet ® 50.

The aluminum pigment pastes from Examples 1, 2, 4 and 5, and from Comparative Examples 1 and 2, were incorporated into an automotive basecoat formulation, prepared as follows:

Enough of each paste to yield 3.56 grams of aluminum is dispersed in 10.52 grams of glycol ether EB and blended until uniform. To this dispersion is added 419.76 grams of a pigmented polyester/polyurethane automotive aqueous basecoat formulation, and the mixture is blended until uniform. These paints are then tested for gas evolution. The data are summarized in Table 3.

TABLE 3

| | PHOSPHATE ESTER | | NITRO-ETHANE PERCENT OF SOLVENT | MLS. H₂ EVOLVED 168 HRS. @ 52° C. |
|---|---|---|---|---|
| | TYPE | PERCENT OF ALUMINUM | | |
| EXAMPLE NUMBER | | | | |
| 1 | Virco-Pet ® 50 | 16.13 | 44.1 | 26.1 |
| 2 | Virco-Pet ® 50 | 16.13 | 91.7 | 13.8 |
| 4 | Virco-Pet ® 40 | 12.53 | 97.8 | 14.3 |
| 5 | Virco-Pet ® 40 | 3.76 | 99.4 | 12.6 |
| COMPARATIVE EXAMPLE NUMBER | | | | |
| 1 | Virco-Pet ® 50 | 16.13 | 0 | 60.0 |
| 2 | NONE | 0 | 50.1 | 72.8 |

The results in the automotive basecoat formulation also show a large reduction in gassing when using both nitroethane and the phosphate as compared to using either, individually. Increasing the nitroethane content provides an additional reduction in gassing, whether Virco-Pet ® 50 or Virco-Pet ® 40 is used.

Example 6

749.3 grams of a leafing aluminum pigment paste; HYDRO PASTE ® 830 WATER DISPERSIBLE ALUMINUM PIGMENT from Silberline, 65% aluminum in a 5/4 blend of mineral spirits/1-nitropropane, is charged into a mixer. 54.0 grams of Virco-Pet ® 50 is added, and the material is mixed for one hour. It is then tested for aqueous stability and appearance as described below.

Example 7

543.4 grams of a leafing aluminum pigment filter cake; 82.8% aluminum in mineral spirits; is charged into a mixer. 45.0 grams of Virco-Pet ® 50 and 78.8 grams of nitroethane is added, so that the nitroethane represents 42.4% of the total solvents. The material is mixed for one hour, then tested for aqueous stability and appearance.

Comparative Example 5

The HYDRO PASTE ® 830 WATER DISPERSIBLE ALUMINUM PIGMENT of Example 6 is tested for aqueous stability and appearance.

Comparative Example 6

543.4 grams of the aluminum pigment filter cake of Example 7 is charged into a mixer, and 125.0 grams of nitroethane is added, so that the nitroethane represents 57.2% of the total solvents. The material is mixed for one hour, then tested for aqueous stability and appearance.

Comparative Example 7

543.4 grams of the leafing aluminum pigment filter cake of Example 7 is charged into a mixer, and 45.0 grams of Virco-Pet ® 50 and 78.8 grams of high flash naphtha is added. The material is mixed for one hour, then tested for aqueous stability and appearance.

96.1 grams of the aluminum pigment pastes from each of the above examples were incorporated into 400.0 grams of a commercially available waterborne asphalt roof coating vehicle. A portion of each was drawn down on laminated cardboard, using a Bird applicator, and the reflectance was measured using a Total Reflectometer. The remainder was tested for gas evolution. The data are summarized in Table 4:

TABLE 4

| | VIRCO-PET ® 50 % OF ALUMINUM | NITRO-PARAFFIN | | MLS. H₂ EVOLVED 168 HRS. @ 52° C. | REFLECTANCE |
|---|---|---|---|---|---|
| | | TYPE | % OF SOLVENT | | |
| EXAMPLE NUMBER | | | | | |
| 6 | 11.1 | 1-nitro-propane | 41.2 | 6.4 | 41.1 |
| 7 | 10.0 | nitro-ethane | 42.4 | 5.7 | 53.6 |
| COMPARATIVE EXAMPLE NUMBER | | | | | |
| 5 | 0 | 1-nitro-propane | 44.4 | 17.8 | 44.3 |
| 6 | 0 | nitro-ethane | 57.2 | 20.3 | 55.4 |
| 7 | 10.0 | NONE | 0 | 19.6 | 46.8 |

Again, the combination of either nitroethane or 1-nitropropane with Virco-Pet ® 50 results in reduced gas evolution compared to using any of the three ingredients, alone. Aesthetically, nitroethane gives higher reflectance values than 1-nitropropane, and the combination of Virco-Pet ® 50 with either solvent lowers the reflectance. However, the mixture of nitroethane and Virco-Pet ® 50 has a reflectance greater than either 1-nitropropane or Virco-Pet ® 50, alone.

Example 8

126.6 grams of the aluminum pigment filter cake of Example 1 is charged into a two-liter reaction flask and slurried in 1000.0 grams of solvent containing 81.3% nitroethane, 16.3% glycol ether DE acetate, and 2.4% water. 10.0 grams of ammonium metavanadate ($NH_4VO_3$) were then added, and the slurry was stirred magnetically for 24 hours at 70° C.. The material was then filtered to approximately 65% non-volatile content, then tested for aqueous stability.

Comparative Example 8

The reaction of Example 8 was repeated, except that the slurry solvent was composed of 80% glycol ether DE acetate and 20% water. The filtered material was then tested for aqueous stability.

The aluminum pigment pastes from the above examples and from Comparative Example 2 were incorporated into the pigmented automotive basecoat formulation described above, and tested for gas evolution. The data are summarized in Table 5:

TABLE 5

| | VANADATE TREATED | SOLVENTS | MLS. $H_2$ EVOLVED 168 HRS. @ 52° C. |
|---|---|---|---|
| EXAMPLE NUMBER | | | |
| 8 | YES | Nitroethane, DE Acetate, Water, Mineral Spirits | 4.1 |
| COMPARATIVE EXAMPLE NUMBER | | | |
| 8 | YES | DE Acetate, Water, Mineral Spirits | 34.0 |
| 2 | NO | Nitroethane, Mineral Spirits | 72.8 |

The data show that the synergistic effect of nitroethane occurs with vanadates, as well as with phosphates.

Although a detailed description of the invention with specific examples has been provided above, the present invention is not limited thereto, but rather is defined in the following claims.

What is claimed is:

1. A paste suitable for formation of a coating composition, comprising:
   metal pigment particles;
   a member selected from the group consisting of an organic phosphate, an organic phosphite and a pentavalent vanadium compound; and
   a solvent which comprises an alkyl or aryl compound having 1 to 20 carbon atoms or a halo or amino substituted alkyl or aryl compound having 1 to 20 carbon atoms and wherein said compound contains a nitro a nitro functional group.

2. The paste of claim 1, wherein the metal pigment particles are made of aluminum or zinc.

3. The paste of claim 1, wherein the metal pigment particles are present in an amount of about 60–72% by weight.

4. The paste of claim 1, wherein an organic phosphate is present in an amount of about 1 to 25% by weight of the metal pigment particles.

5. The paste of claim 1, wherein the solvent is present in an amount of about 28 to 40% by weight of the paste and the nitro-containing compound is present in an amount of about 5 to 100% by weight of the solvent.

6. The paste of claim 4, wherein the amount of organic phosphate is about 3 to 15% by weight of the metal pigment particles.

7. The paste of claim 5, wherein the amount of nitro-containing compound is about 20 to 100% by weight of the solvent.

8. The paste of claim 7, wherein the amount of nitro-containing compound is about 35 to 100% by weight of the solvent.

9. The paste of claim 1, wherein a pentavalent vanadium compound is present in an amount of about 1 to 30% by weight of the metal pigment particles.

10. An aqueous coating composition comprising:
    a metal pigment-containing paste as claimed in claim 1; and
    an aqueous carrier.

11. The paste of claim 9, wherein the amount of the pentavalent vanadium compound is about 5 to 15% by weight of the metal pigment particles.

12. The paste of claim 1, wherein an organic phosphite is present in an amount of about 2 to 15% by weight of the metal pigment particles.

13. The paste of claim 12, wherein the amount of the organic phosphite is about 5 to 10% by weight of the metal pigment particles.

14. A method of making a metal pigment paste useful for forming a coating composition, comprising:
    producing metal pigment particles; and
    treating the pigment particles with (a) an organic phosphate, (b) an organic phosphite or (c) a pentavalent vanadium compound, and a solvent which comprises an alkyl or aryl compound having 1 to 20 carbon atoms or a halo or amino substituted alkyl or aryl compound having 1 to 20 carbon atoms and wherein said compound contains a nitro a nitro functional group.

15. The method of claim 14, wherein the pigment particles are treated with a treatment solution which comprises the organic phosphate, organic phosphite or pentavalent vanadium compound and the solvent.

16. The method of claim 14, wherein the pigment particles are first treated with the solvent and then treated with an organic phosphate or organic phosphite.

* * * * *